J. WINKLER.
VEHICLE BODY.
APPLICATION FILED APR. 20, 1917.
1,322,666.
Patented Nov. 25, 1919.
3 SHEETS—SHEET 1.
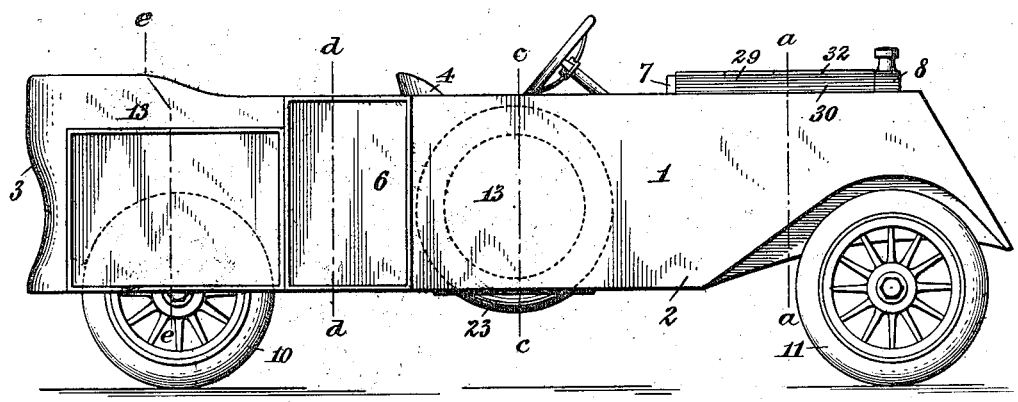
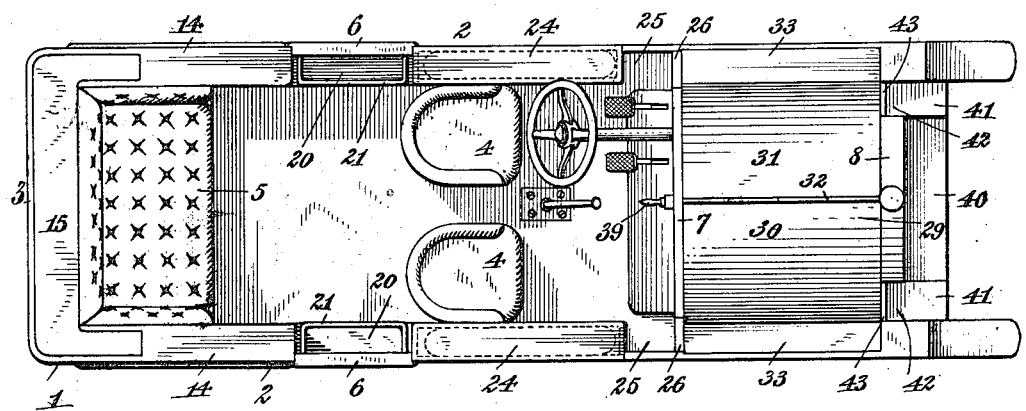
Witness:
E. M. Schweiger.
Julius Winkler, Inventor.
By Emil Heubart
Attorney.

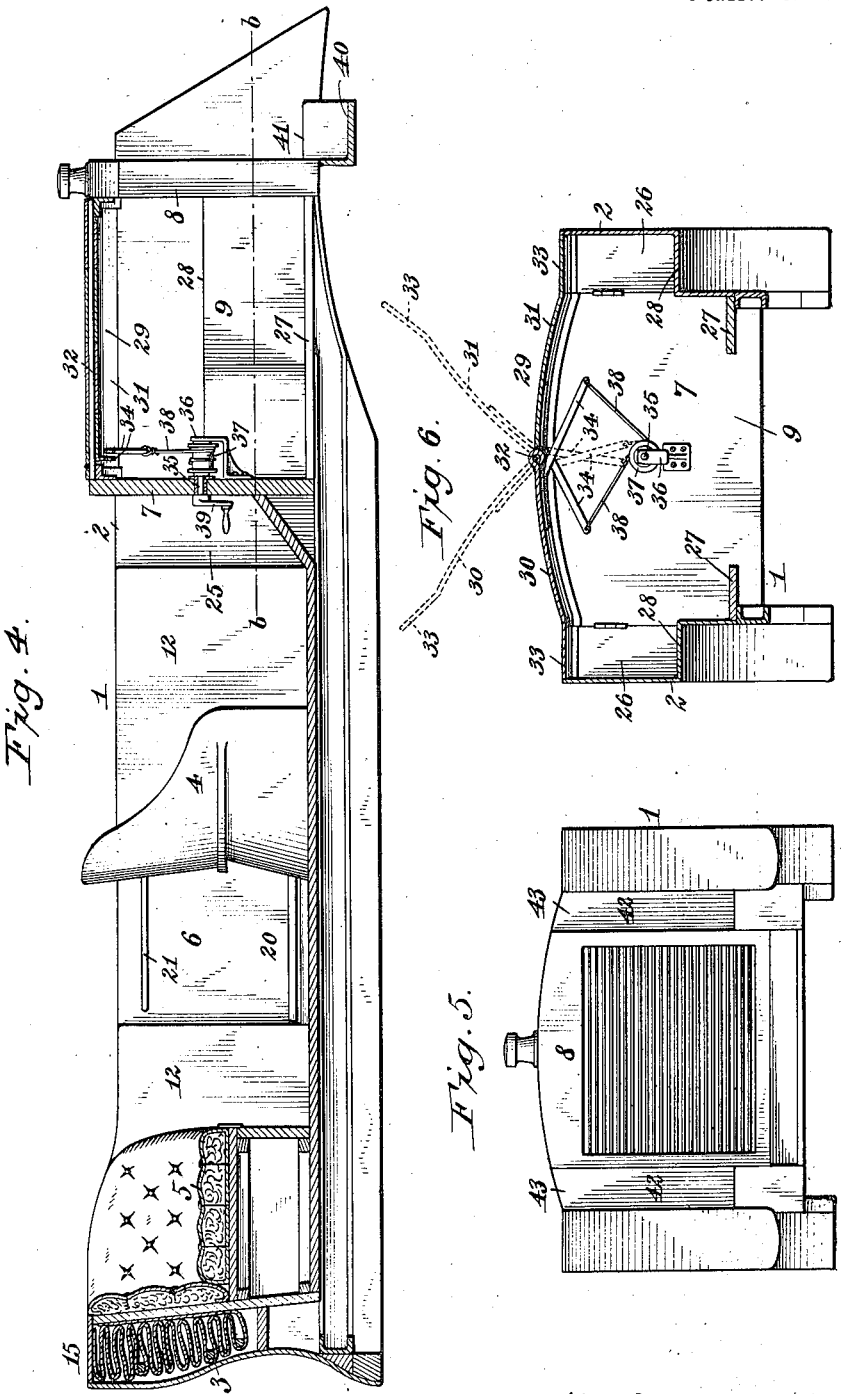

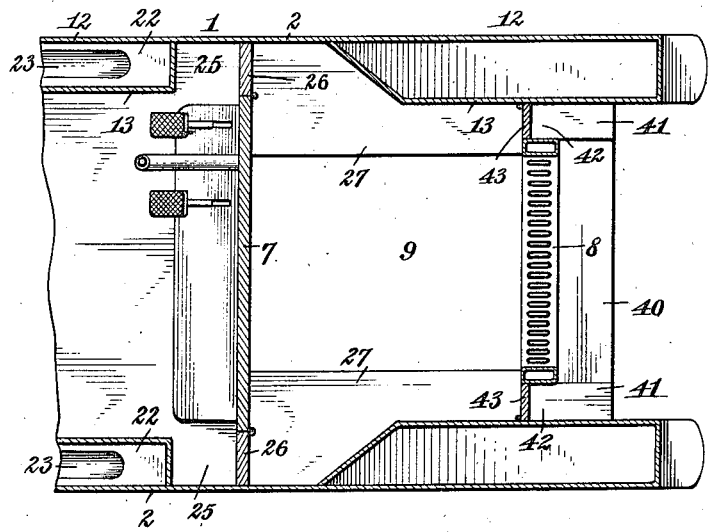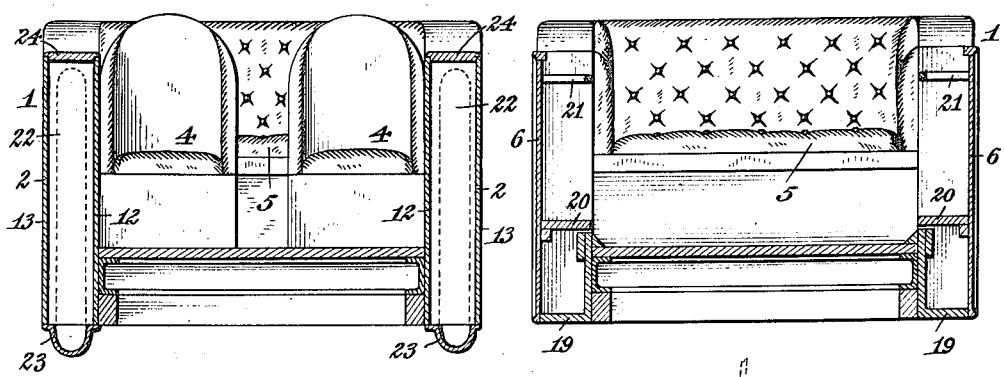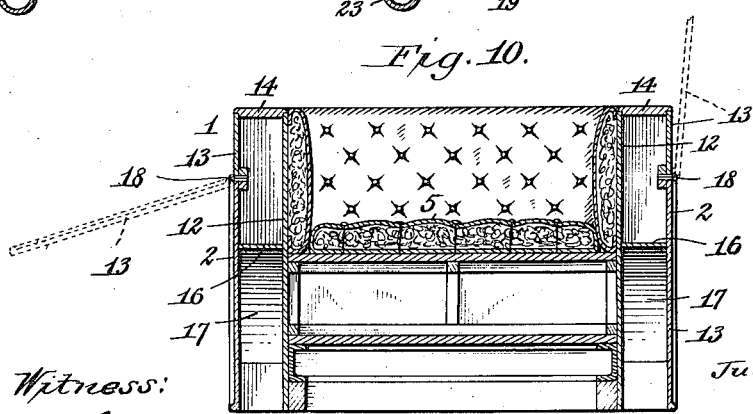

UNITED STATES PATENT OFFICE.

JULIUS WINKLER, OF BUFFALO, NEW YORK.

VEHICLE-BODY.

1,322,666.  Specification of Letters Patent.  Patented Nov. 25, 1919.

Application filed April 20, 1917. Serial No. 163,442.

*To all whom it may concern:*

Be it known that I, JULIUS WINKLER, a citizen of the United States, residing at Buffalo, in the county of Erie and State of New York, have invented certain new and useful Improvements in Vehicle-Bodies, of which the following is a specification.

My invention relates to vehicle bodies, and more particularly to an automobile body of the type known as a "touring" body.

One of the objects of my invention is the construction of a body of this type having straight-lined sides which are in a plane outside of the wheels of the vehicle, and in which provision is made for inclosing the upper half, or approximately the upper half, of the rear or traction wheels within the walls of the body.

Another object of my invention is to so construct the body that it is provided with wheel-receiving chambers into which the upper portions of the rear or traction wheels project, and which chambers are provided with invisible mud guards; said chambers having their outer walls or a part thereof movable, preferably hinged, so that they serve as doors which may be swung outwardly to render the rear or traction wheels easily accessible.

Another object of my invention is to provide a vehicle body in which the usual exposed running board is dispensed with and which is provided with side entrance doors and steps concealed when said entrance doors are closed, said steps providing ready access to the interior of the body when said entrance doors are opened.

A further object of my invention is to provide side walls with upwardly opening chambers which are preferably disposed at opposite sides of the front seat or seats and in which extra tires may be conveniently carried, said chambers being closed by suitable doors or lids.

A still further object is to provide an automobile in which the sides thereof are carried forward along opposite sides of the engine space so that continuous straight lines are provided at opposite sides of the body from the extreme forward to the extreme rearward end thereof.

Another object of my invention is to provide the vehicle with straight-lined sides in which depressions are formed at or near their front ends, the upper walls of which depressions serve as mud guards and the outer edges of which guards meet the lower edges of said side walls in planes outside of said front or steering wheels.

A further object is the provision of a vehicle body of the type described in which the side walls are carried forwardly along opposite sides of the engine space and in which said engine space is accessible from the interior of the body for making repairs, adjustments and the like to the engine or other parts within the engine space.

A further object is the provision of an automobile body in which the side walls of the body are carried forward along opposite sides of the engine space with the opposite sides of the engine hood supported by said forwardly extended portions of said side walls.

A further object of my invention is the provision of a vehicle body of the type described in which access may be had to the engine space through openings provided at opposite sides of the radiator.

A still further object is to provide an automobile with an engine hood in which one or more parts thereof are movable to expose the engine and in which said part or parts are moved by manipulation of an operating element within the automobile body.

A still further object is to provide a vehicle body of this type with an engine hood having two pivotally connected parts adapted to swing upwardly and inwardly and means for swinging said parts in unison when actuating a single element.

Further objects of my invention will appear hereinafter and relate to novel features of construction and arrangements of parts.

The invention consists in the novel features of construction and in the arrangement and combination of parts to be hereinafter described and more particularly pointed out in the subjoined claims.

In the drawings,—

Figure 1 is a side elevation of an automobile body constructed in accordance with my invention, the same being shown in connection with the steering and traction wheels, the springs and other parts intermediate the body and said wheels being omitted as they form no part of this invention and would not aid in further disclosing the invention.

Fig. 2 is a plan view of the same.

Fig. 3 is a side elevation showing one of the side entrance doors open, and the door to one of the rear wheel chambers swung upwardly to render the wheel projecting into the chamber fully accessible for removing the tire from the wheel or applying a tire thereto.

Fig. 4 is a longitudinal section on an enlarged scale, taken centrally through the body, the steering wheel and post, and controlling lever and pedals being omitted.

Fig. 5 is a front elevation of the body.

Fig. 6 is an enlarged transverse section taken on line a—a, Fig. 1.

Fig. 7 is a horizontal section taken on line b—b, Fig. 4.

Fig. 8 is an enlarged transverse section taken on line c—c, Fig. 1.

Fig. 9 is an enlarged transverse section taken on line d—d, Fig. 1.

Fig. 10 is an enlarged transverse section taken on line e—e, Fig. 1.

Referring now to the drawings in detail, like numerals of reference refer to like parts throughout the several figures.

The reference numeral 1 designates the automobile body, considered as a whole. 2 designates the side walls thereof, and 3 the rear wall rounded at opposite ends into the side wall, as shown. 4 designates the front seats of the vehicle, 5 the rear seat, 6 the side entrance doors, 7 the dash-board, and 8 the radiator, all of which are arranged in their usual positions, the radiator being spaced a distance from said dash-board 7 to provide the usual engine space 9. The limits of said engine space at the side are the side walls of the body which are carried forwardly in a straight line to a point beyond the radiator. The outer faces of the side walls are arranged in a plane outside of the traction and steering wheels 10, 11 of the automobile, respectively, so that viewing the body from the rear it is considerably wider than the ordinary type of automobile body.

The interior dimensions of the body conform to the measurements of the present type of body now in use, this being due to the fact that the side walls, or at least parts thereof, are chambered or made hollow and therefore have inner walls 12 and outer walls 13.

The side walls are chambered from the side entrance doors 6 rearwardly, and the rear wall is also chambered. The tops of the side walls at these points are closed with suitable covers or lids 14 along a portion of their lengths; they, however, are open at the top along their rear portions so that the bows of a collapsible or folding top may drop into said chambers, which chambers may be considered extensions of the chamber in the rear wall, into which the major portion of the folding top is adapted to be lowered. The top when folded has a cover 15 which closes the chamber at the rear and the opened portions of the chambers at the sides, said cover serving as the front member of the top when opened. This top, however, forms no part of this invention and is not therefore illustrated in detail, except as it incidentally appears in the figures selected to illustrate this invention.

The rear seat 5 is therefore surrounded by a chambered wall, a portion of which receives the folding or collapsible top of the vehicle so that the top is fully concealed and a part thereof serves as a cover for said chambered walls. In each of the chambered portions at the sides of the rear seat, I provide a mud guard 16, and the lower portion of said chambered side walls serve as wheel receiving chambers 17 into which the upper half, or more or less, of the rear or traction wheels project.

Portions of the outer wall 13 are made removable at opposite sides of the rear seat and serve as doors, whereby the wheel receiving chambers 17 are opened, said doors being preferably hinged, as at 18, so that they may be swung upwardly, but it is clear that any other arrangement may be provided for swinging the doors or, if desired, these doors may be otherwise attached and be entirely removed from the body when access is desired to said wheel receiving chambers. In either case the rear or traction wheels are rendered fully accessible for conveniently examining the tires; making repairs thereto; changing tires, or removing the wheels from their axles.

Those portions of the side walls formed by the side entrance doors may be chambered like the portions at opposite sides of the rear seat, but I preferably make these doors of single walls, as shown in Fig. 9. Each of these doors closes against a step 19 secured to the frame of the vehicle body, or fastened in any other suitable manner, these steps being in the plane of the conventional running boards arranged along the sides of the usual vehicle body; but instead of extending from points near the rear wheels to points near the front wheels, these steps in my vehicle body have a length equaling only the width of the entrance openings which are closed by said side entrance doors.

Each of the doors has an inwardly-projecting guard 20 which closes the space over the step 19 when the door is closed so that there is no possibility of the occupants accidentally stepping over the edge on the floor of the body and becoming injured. I have also provided each of the doors with a rack 21 for hanging robes or articles of clothing.

At opposite sides of the front seats 4 the side walls are also chambered or hollowed, as shown at 22, and as the height of the body in some instances would be less than the diameter of the tires used on the vehicles, I have secured a pan 23 to the lower end of each chamber thus formed. This pan is concaved both transversely and longitudinally to conform to the shape of automobile tires, and in these chambers spare tires may be placed, the lower portions of which would enter said pans. The tops of the chambers may be closed by suitable lids or covers 24 hinged or otherwise held in place.

The dash board 7 is somewhat narrower than the interior of the body and open spaces 25 are formed between the tire-receiving chambers 22 and the dash board. These spaces are formed by making the side walls of the body thinner at this point, thus leaving spaces between the side edges of the dash board and said walls which are closed by doors 26 hinged to said dash board so as to swing inwardly into the engine space.

By continuing the side walls of the body portion forwardly along opposite sides of the space occupied by the engine, said space is comparatively wide and enables the operator of the vehicle to enter the same by opening the doors 26 and passing along floor pieces 27 which are supported by the frame of the body, as clearly shown in Fig. 6, and are arranged at opposite sides of the space occupied by the engine. The top walls of the recesses formed in the sides of the vehicle body at their front ends provide seats 28, which are formed over said recesses, thus enabling the operator of the vehicle to enter the engine space from the body portion and make repairs or adjustments while conveniently seated. The side walls above the seat are preferably of single construction so as to provide the necessary room for the operator while making repairs or adjustments to the engine or parts within the engine space.

At their front ends the side walls are tapered downwardly, as shown in Figs. 1, 3 and 4, thus providing deflecting surfaces which eliminate resistance to the air during travel.

It is of course understood that the windshield usually employed on vehicles of this type may be secured to the dash board 7 in any practicable manner and that the usual instruments may be applied to the dash in the customary way.

The engine space is covered by a hood 29 which extends from one side wall to the other. This engine hood comprises two segmental parts 30, 31, pivotally connected together, as at 32, and supported at their points of connection on the dash board 11 and radiator, respectively. The sides of these segmental parts are provided with flat extensions 33 which receive support from the side walls and also from the doors 26. For convenience in swinging the parts of the hood upwardly, I have secured to each of said parts a downwardly and outwardly directed lever 34, said levers being secured to the underside of the segmental parts, as clearly shown in Fig. 6.

To a shaft 35 journaled in the dash board 7, and in a bracket 36 secured to the front of said dash board on said shaft is secured a sheave or pulley 37 to which are secured cables 38, the other ends of said cables being secured to the outer or free ends of the levers 34. The rear end of said shaft projects into the body portion of the vehicle and has an operating crank 39 secured thereto. When turning said crank to revolve said shaft, and the sheave or pulley secured thereto, the cables 38 are wound upon said sheave or pulley and draw the levers 34 from the positions shown in full lines in Fig. 6 to those shown in dotted lines; whereupon the two parts of the hood 29 are caused to swing upwardly and inwardly into the positions shown in dotted lines in said figure. The operator of the vehicle can therefore easily enter the engine space from that portion of the body in rear of the dash board and make the desired repairs or adjustments to parts within the engine space while the parts of the hood are thus elevated.

For convenience in entering the engine space from the front of the vehicle, I have provided a step 40 which leads to extensions 41 of the floor boards 27, said extensions projecting forwardly beyond the radiator. Spaces 42 are provided at opposite sides of the radiator which lead to the engine spaces in rear of the radiator, and these spaces are preferably closed by doors 43 which are hinged to the side walls of the vehicle body so that they swing outwardly away from the radiator and permit the operator to enter the engine space from the front.

The present invention is in no manner intended to be restricted to the exact design of body herein shown and described, nor to the embodiment of all features thereof in a single body, since the design of the body may be greatly varied without dispensing with certain features of the invention. Furthermore, the body may be differently constructed than herein shown and described while employing only part of my invention. Therefore many changes could be made in the construction and design of the body herein illustrated and described without departing from the scope of this invention, and it is intended that the invention as herein illustrated and described shall be interpreted as illustrative and not in a limiting sense.

Having thus described my invention, what I claim is,—

1. An automobile body having its sides extending forwardly along opposite sides of the engine space and having a radiator between said forwardly extending sides, said radiator being spaced from said sides to provide means of access to the engine space from the front of the automobile body.

2. An automobile body having its sides extending forwardly along opposite sides of the engine space and having a radiator between said sides spaced from the latter, doors closing the spaces between the sides of the radiator and said extending sides of the automobile body, and a hood covering said engine space.

3. An automobile body having sides extending forwardly in a straight line along opposite sides of the engine space, a radiator between said forwardly extending sides spaced from the latter, and a step at the front of said body whereby access may be gained to the engine space through the spaces intervening between said radiator and said forwardly extending sides.

4. An automobile body having its side walls extended forwardly along opposite sides of the engine space, a dash board at the rear of said engine space separated from said sides by intervening spaces, doors closing said spaces, and a hood extending over said engine space and supported by said dash board and by the forwardly extending portions of said side walls.

5. An automobile body having an engine hood comprising two pivotally connected parts, a lever secured to each of said parts and extending downwardly and outwardly therefrom, a cable pulley rotatably mounted, means for rotating said pulley, and cables connecting said pulley with said levers.

6. An automobile body having a chamber in each of its side walls, into which chambers the upper portions of the rear or traction wheels are adapted to extend, the outer walls of said chambers being flush with the adjacent portion of said body and being hinged to render the rear or traction wheels accessible in their entirety.

7. An automobile touring body having straight-lined side walls extending from front to rear with the opposite side walls parallel throughout their lengths, the lower portions of said side walls at the front having open recesses to receive portions of the front steering wheels and the rear portions of said walls having closed chambers to receive portions of the rear or driving wheels, the outer walls of said chambers being flush with the surrounding portions of said side walls and being movable to permit the removal of said rear or driving wheels.

In testimony whereof I affix my signature.

JULIUS WINKLER.